（12）United States Patent
Strauss

(10) Patent No.: US 9,827,670 B1
(45) Date of Patent: Nov. 28, 2017

(54) COAXIAL FINGER FACE AND BASE ENCODING

(71) Applicant: X Development LLC, Mountain View, CA (US)

(72) Inventor: Marc Strauss, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/163,179

(22) Filed: May 24, 2016

(51) Int. Cl.
*B25J 9/00* (2006.01)
*B25J 9/16* (2006.01)
*B25J 13/08* (2006.01)
*B25J 15/08* (2006.01)

(52) U.S. Cl.
CPC .......... *B25J 9/1612* (2013.01); *B25J 9/1694* (2013.01); *B25J 13/084* (2013.01); *B25J 15/08* (2013.01); *Y10S 901/31* (2013.01); *Y10S 901/33* (2013.01)

(58) Field of Classification Search
CPC combination set(s) only.
See application file for complete search history.

(56) References Cited

U.S. PATENT DOCUMENTS

| 5,373,747 | A * | 12/1994 | Ogawa | B25J 13/084 73/862.041 |
| 6,016,385 | A * | 1/2000 | Yee | B25J 3/04 446/327 |
| 7,010,390 | B2 * | 3/2006 | Graf | B25J 9/1682 318/568.1 |
| 8,231,158 | B2 * | 7/2012 | Dollar | B25J 9/104 294/106 |
| 8,498,745 | B2 * | 7/2013 | Umetsu | B25J 5/007 318/568.16 |
| 8,504,205 | B2 * | 8/2013 | Summer | B25J 5/005 700/258 |
| 9,205,567 | B2 * | 12/2015 | Rose | F04B 9/10 |
| 2007/0078564 | A1 * | 4/2007 | Hoshino | G06K 9/00362 700/245 |
| 2007/0147978 | A1 * | 6/2007 | Mochizuki | B25J 7/00 414/729 |
| 2009/0069942 | A1 * | 3/2009 | Takahashi | B25J 9/1633 700/260 |
| 2009/0302626 | A1 * | 12/2009 | Dollar | B25J 9/104 294/106 |
| 2010/0010670 | A1 * | 1/2010 | Matsukuma | B25J 9/104 700/245 |

(Continued)

*Primary Examiner* — Jonathan L Sample
(74) *Attorney, Agent, or Firm* — McDonnell Boehnen Hulbert & Berghoff LLP

(57) ABSTRACT

Disclosed herein are implementations that relate to determining tactile information using encoders coupled to one or more fingers of a robotic gripping device. The robotic gripping device may include a finger. The finger may include a deformable front face, a base link, a first encoder, and a second encoder. The first encoder may be coupled to the base link of the finger, and configured to detect a grip angle of the finger while the robotic gripping device is gripping an object. The second encoder may be coupled to the deformable front face of the given finger, proximate to the base link of the finger. Additionally, the second encoder may be configured to detect a bend angle of the deformable front face of the finger while the robotic gripping device is gripping the object.

20 Claims, 7 Drawing Sheets

(56) References Cited

U.S. PATENT DOCUMENTS

| | | | |
|---|---|---|---|
| 2010/0138039 A1* | 6/2010 | Moon | B25J 9/1612 |
| | | | 700/245 |
| 2010/0292837 A1* | 11/2010 | Takahashi | B25J 9/1612 |
| | | | 700/245 |
| 2010/0292842 A1* | 11/2010 | Takahashi | B25J 9/1612 |
| | | | 700/262 |
| 2011/0156416 A1* | 6/2011 | Kawanami | B25J 15/0213 |
| | | | 294/110.1 |
| 2013/0057004 A1* | 3/2013 | Murata | B25J 15/0009 |
| | | | 294/106 |
| 2014/0025205 A1* | 1/2014 | Inazumi | B25J 9/1694 |
| | | | 700/258 |
| 2014/0132018 A1* | 5/2014 | Claffee | B25J 9/0015 |
| | | | 294/192 |
| 2014/0156066 A1* | 6/2014 | Sakano | B25J 13/082 |
| | | | 700/245 |
| 2015/0165620 A1* | 6/2015 | Osaka | B25J 13/088 |
| | | | 700/250 |
| 2016/0221196 A1* | 8/2016 | Suzuki | B25J 15/0425 |
| 2016/0263747 A1* | 9/2016 | Yokoi | B25J 9/1633 |

* cited by examiner

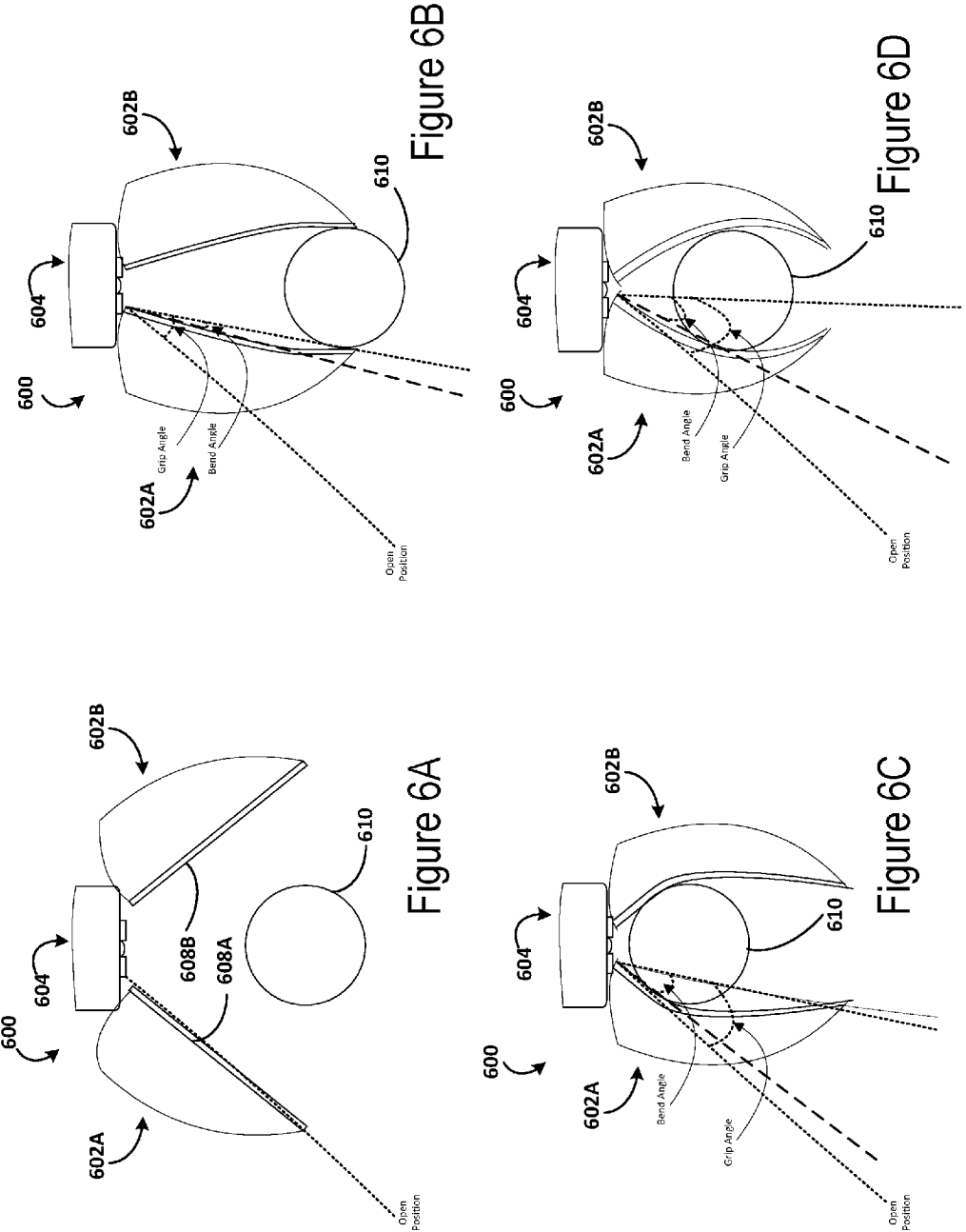

US 9,827,670 B1

COAXIAL FINGER FACE AND BASE ENCODING

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

A robotic gripping device is disclosed that includes a finger. The finger may include a deformable front face, a base link, a first encoder, and a second encoder. The first encoder may be coupled to the base link of the finger, and configured to detect a grip angle of the finger while the robotic gripping device is gripping an object. The second encoder may be coupled to the deformable front face of the given finger, proximate to the base link of the finger. Additionally, the second encoder may be configured to detect a bend angle of the deformable front face of the finger while the robotic gripping device is gripping the object.

In another example, a robot is described. The robot may include a finger. The finger may include a deformable front face, a base link, a first encoder, and a second encoder. The first encoder may be coupled to the base link of the finger, and configured to detect a grip angle of the finger while the robotic gripping device is gripping an object. The second encoder may be coupled to the deformable front face of the given finger, proximate to the base link of the finger. Additionally, the second encoder may be configured to detect a bend angle of the deformable front face of the finger while the robotic gripping device is gripping the object. The robot may also include a control system configured to (i) receive sensor data indicative of the grip angle of the finger from the first encoder of the finger, and (ii) receive sensor data indicative of the bend angle of the deformable front face of the finger from the second encoder of the finger.

In yet another example, a method is described. The method involves gripping, by a finger of a robotic gripping device, an object. The method also involves detecting, by a first encoder coupled to a base link of the finger, a grip angle of the finger while the robotic gripping device is gripping the object. The method further involves detecting, by a second encoder coupled to a front face of the finger and proximate to the base link of the finger, a bend angle of the deformable front face of the given finger while the robotic gripping device is gripping the object.

In yet a further example, the robotic gripping device may include means for gripping an object with a finger. The finger may include a deformable front face, a base link, a first encoder, and a second encoder. The first encoder may be coupled to the base link of the finger, and the second encoder may be coupled to the deformable front face of the given finger, proximate to the base link of the finger. The robotic gripping device may also include a means for detecting a grip angle and bend angle of an object while the robotic gripping device is gripping the object. The first encoder may be configured to detect a grip angle of the finger while the robotic gripping device is gripping an object. Additionally, the second encoder may be configured to detect a bend angle of the deformable front face of the finger while the robotic gripping device is gripping the object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 6A illustrates an example robotic gripping device in an open position, according to an example implementation.

FIG. 6B illustrates an example robotic gripping device grasping an object by the fingertips of the robotic gripping device, according to an example implementation.

FIG. 6C illustrates an example robotic gripping device grasping an object near the base of the fingers of the robotic gripping device, according to an example implementation.

FIG. 6D illustrates an example robotic gripping device grasping an object near the middle portion of the fingers of the robotic gripping device, according to an example implementation.

DETAILED DESCRIPTION

Figure 1:
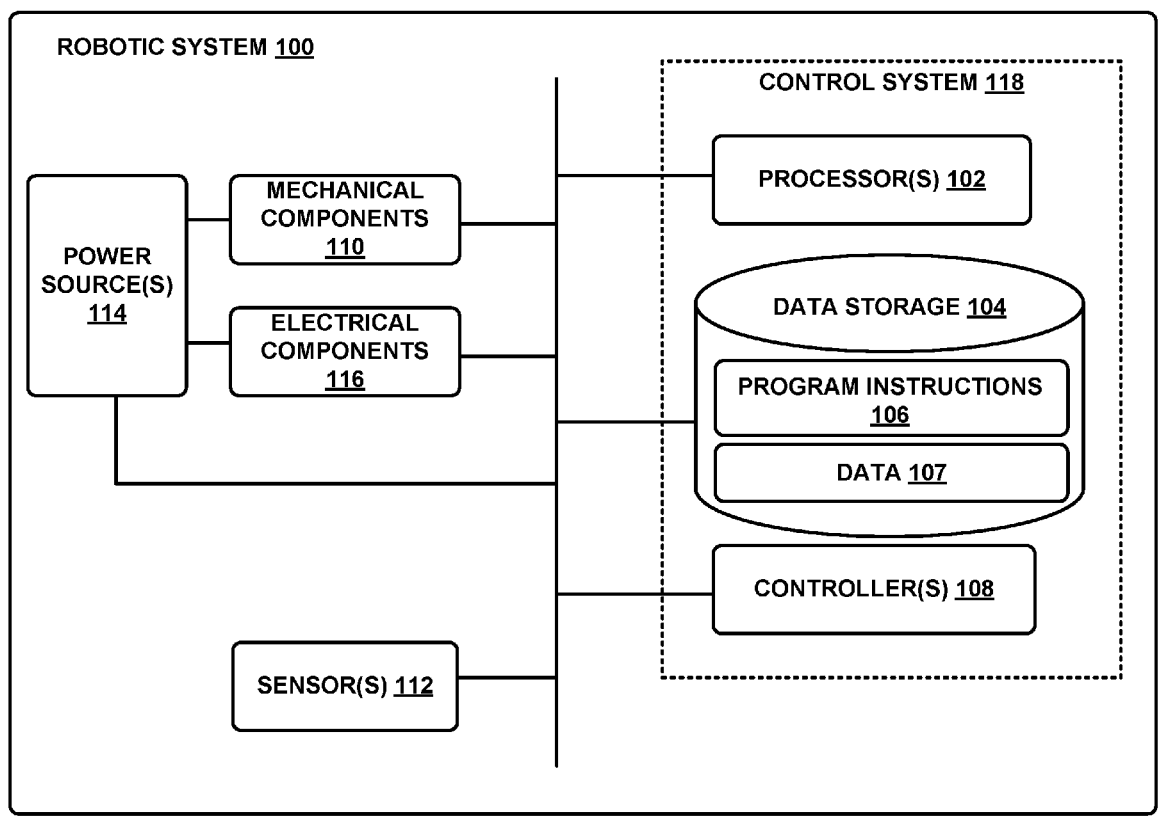
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

Robotic arms may include many different types of end effectors. One often used type of end effector is a gripper or a robotic gripping device, which allows a robotic arm to grip or grasp an object. Many robotic gripping devices include one or more fingers that act to grasp an object in a pincer-like or pinching manner. In some cases, these robotic gripping devices may include underactuated fingers. Underactuated fingers include the benefit of less complexity and easier control because each phalanx of the finger is not independently actuated. Instead, the full finger is actuated together.

In some instances, however, it may be difficult to know the shape of an underactuated finger when an object is grasped because each phalanx is not independently actuated. It may also be difficult to know the size, position, or location of the object being grasped. In many applications, it may be beneficial to know the position, orientation, or shape of a finger. It may also be beneficial to know the size, position, location, or shape of the object being grasped, or the grip quality of a finger grasping the object. To accomplish this task, one technique may include attaching one or more sensors to the components of the robotic gripping device that can detect the position (e.g., angle) of a finger. However, using multiple sensors or particularized sensors for a specific purpose may require a complex control system and/or a complex arrangement of components. It may also limit mobility, increase the cost of manufacturing, or otherwise detract from the efficiency and usefulness of a robotic device.

Example embodiments described herein provide devices, systems, and/or methods without the use of overly complex sensors and control systems. Example embodiments of a robotic gripping device may include a finger with a first encoder and a second encoder to acquire an approximation of the shape of the finger while grasping an object, or determine the size, position, or location of the object being grasped. The finger may also include a deformable front face and a base link. A base link may be, for example, a joint or linkage adjacent to a bottom portion of the front face of a finger that couples the finger to an actuator of the robotic gripping device. The actuator may rotate the base link of the finger in order to move the finger towards or away from an object. The first encoder may be coupled to the base link of a finger, and the second encoder may be coupled to the deformable front face of the finger, proximate to the base link of the finger. Keeping the first encoder and second encoder proximate to the base link and/or proximate to each other may reduce cost and footprint of the robotic gripping device, while making it easier to enshroud each encoder. Additionally, keeping the first encoder and second encoder proximate to the base link (rather than an encoder or sensor on the finger) may allow the finger to remain without any active (e.g., powered) elements. A passive (e.g., non-powered) finger may be less expensive and easier to replace for maintenance. To further reduce the complexity of the robotic gripping device, the first encoder and second encoder may be aligned on the same rotational axis.

In some examples, the first encoder may be configured to detect a grip angle of a finger while the robotic gripping device is gripping an object. A grip angle may be the amount of rotation of a finger through its respective axis (e.g., half turn, quarter turn, twenty degree turn, etc.) from an open position (e.g., starting position of the robotic gripping device) to a position in which the finger is in contact with an object.

Further, the second encoder may be configured to detect a bend angle of the deformable front face of the finger while the robotic gripping device is gripping an object. A bend angle may be the amount of curvature, or bendedness of the deformable front face of the finger after the finger makes contact with an object. The front face may continue to deform, bend, curve, warp, stretch, or otherwise alter its shape (thereby increasing the bend angle) while more pressure is applied to an object. The bend angle may be measured from the bottom of the deformable front face near the base of the finger, and the overall bendedness or deformity of the front face may be determined based on this measurement.

The robotic gripping device may also include an actuator configured to move a finger towards or away from an object. The actuator may be coupled to the base link of the finger. In such arrangement, the actuator may be configured to move the finger by moving the base link of the finger.

Additionally, the robotic gripping device may include a control system that is configured to receive sensor data from the first encoder and the second encoder. For example, the control system may receive sensor data indicating the grip angle of the finger while the robotic gripping device is gripping an object. In a further example, the control system may receive sensor data indicating the bend angle of the finger while the robotic gripping device is gripping the object.

Based on the grip angle and the bend angle, the control system may determine a grip quality of the finger. In many applications of robotic gripping devices in which the robotic gripping device interacts with an environment, the grip quality of a finger gripping an object is of particular relevance. A grip quality may be, for example, a measure of what portion of the front face is in contact with the object being grasped. In other words, it may provide an approximation of the shape of the finger when an object is grasped. Additionally, grip quality may be a measure of how firmly an object is grasped by the robotic gripping device, or how much control the robotic gripping device has over an object that is grasped.

In some instances, however, the robotic gripping device may end up with an undesirable grip quality when grasping an object. For example, the object may inadvertently move while one or more fingers are moved towards the object to grasp the object. In another example, based on optical sensor data received, the control system may cause the robotic gripping device to place its fingers in a certain position before grasping an object. In this example, however, the optical sensor data associated with the object and/or environment surrounding the robotic gripping device may be inaccurate, thereby causing an undesirable grip quality when grasping the object.

To improve the grip quality of the finger, the control system may be configured to cause the finger to adjust its grip. For example, the robotic gripping device may grasp an object by the fingertips of the finger at a certain grip angle and bend angle. To improve the grip quality (e.g., to have better control over the object), it may be desirable to adjust the grip angle of the finger and/or bend angle of the front face of the finger. In some examples, it may be desirable to grasp the object at the middle portion of the finger instead of grasping the object by the fingertips. To adjust the grip, the control system may cause the actuator to move the finger away from the object that is being grasped by the fingertips, change the position of the robotic gripping device, and then cause the actuator to move the finger back towards the object to grasp the object at the middle portion of the finger.

Additionally, based on the grip angle and the bend angle, the control system may determine the shape and/or size of the object being grasped. Determining the shape and/or size of the object is of particular relevance as it provides additional tactile information in an environment in which the robotic gripping device interacts. For example, the control system of the robotic gripping device may distinguish a rectangular object from a cylindrical or spherical object. A cylindrical or spherical object may cause a greater bend angle as the front face of the finger will likely deform or bend into the curvature of such object as the finger makes contact with the object and further applies pressure to it.

In addition, based on the grip angle and the bend angle, the control system may determine additional tactile information, such as the location of the object being grasped. Determining the location of the grasped object within the robotic gripping device is of particular relevance as it provides the ability to deterministically bring the object into physical interaction with the environment. For example, if the object is a tool, knowing the location of the tool within the robotic gripping device is necessary to bring the tool into locationally accurate contact with the workpiece. In another example, knowing the location of the object within the robotic gripping device allows the robot to set the object down gently on a surface.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors (or encoders) to sense or detect the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
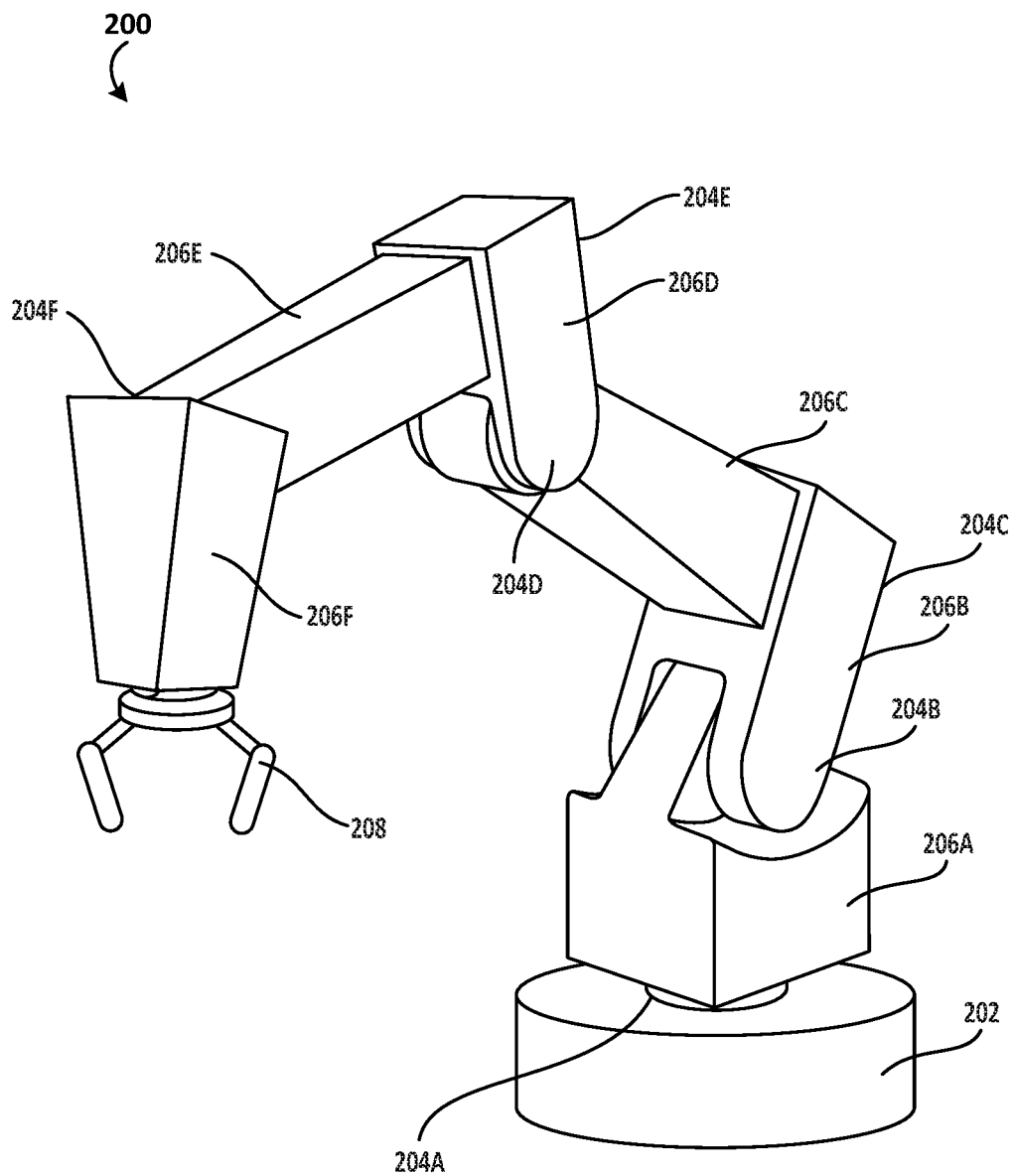
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (e.g., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
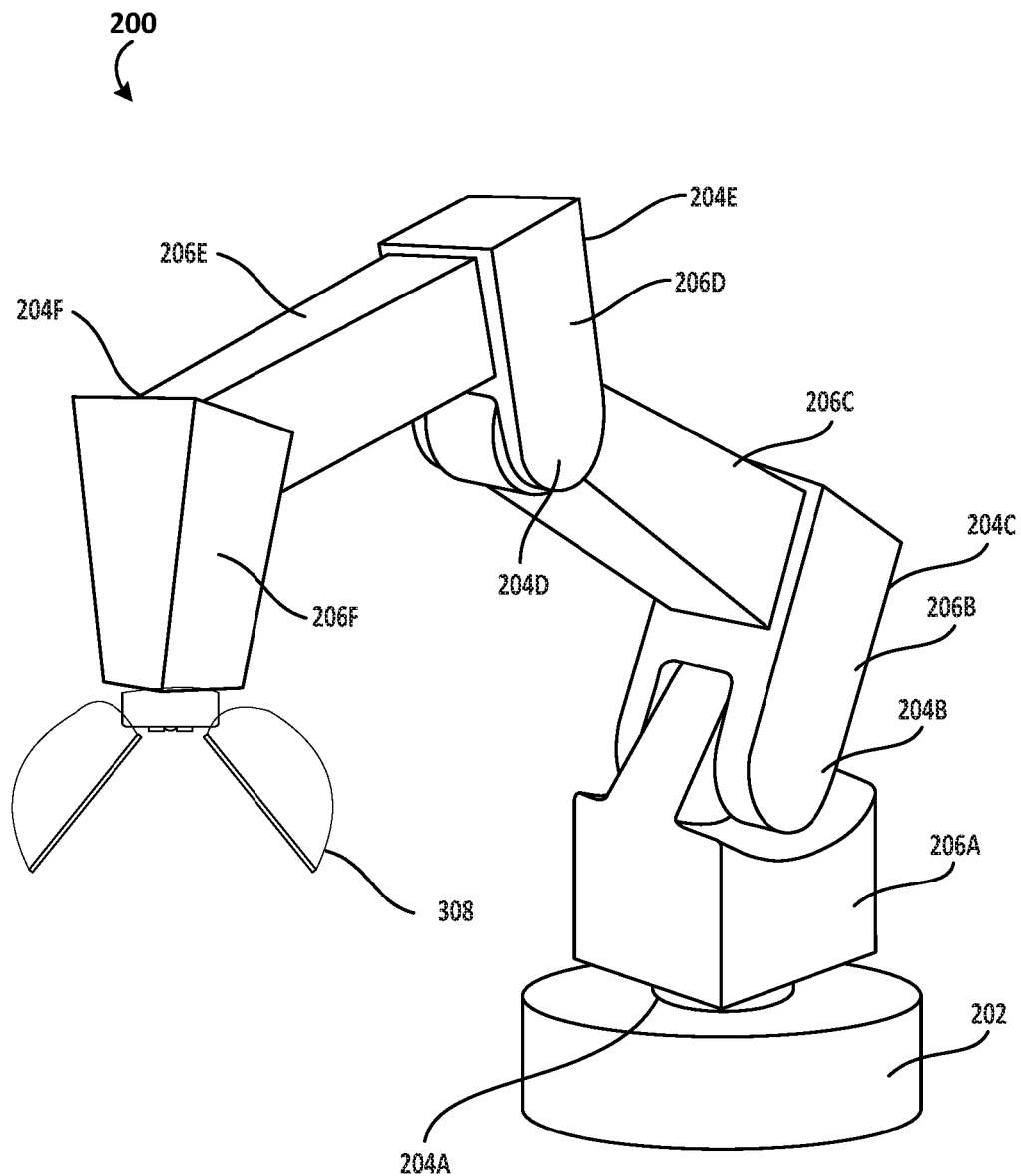
FIG. 3 illustrates the example robotic arm of FIG. 2 having a robotic gripping device, according to an example implementation.

FIG. 3 shows the example robotic arm 200 with a robotic gripping device 308. Robotic gripping device 308 may be similar or identical to robotic gripping device 400 or 600 described in more detail below.

III. EXAMPLE ROBOTIC GRIPPING DEVICE

Figure 4:
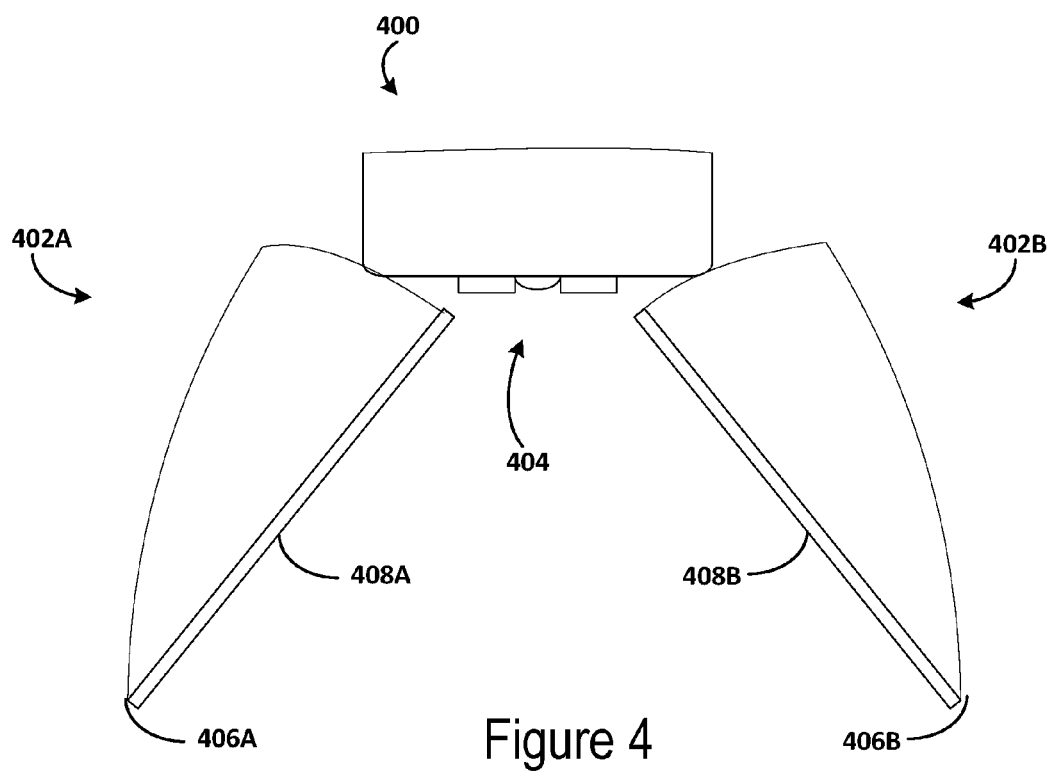
FIG. 4 illustrates an example robotic gripping device, according to an example implementation.

FIG. 4 illustrates an example robotic gripping device 400 according to an example implementation. Robotic gripping device 400 may be implemented as a mechanical component of system 100 and/or robotic arms 200 and/or 300. Although the components illustrated in FIG. 4 are shown with a certain orientation and/or design, it should be understood that one or more components of robotic gripping device 400 may be removed, added, and/or modified while remaining within the scope of this disclosure. Also, the orientation and combination of components may be changed based on the desired implementation.

Robotic gripping device 400 may include one or more physical components, including one or more fingers 402A-B and actuator 404. In some examples, robotic gripping device 400 may include two opposable fingers, as shown in FIG. 4. In other examples, more or fewer fingers may be included. For instance, where three or more fingers are included, the fingers may be arranged in two groups opposing each other, such that when they are actuated they close toward each other. Two fingers may be positioned opposite the third, such that when the fingers close they interlock. In an example embodiment in which only one finger is included, the finger may be coupled to either end of the actuator. The finger may grasp an object by trapping the object against a wall, or another object, among other examples.

In some embodiments, robotic gripping device 400 may include an actuator 404 configured to move finger 402A and/or 402B towards or away from an object. Actuator 404 may be coupled to a base link of each finger. As used herein, a first component "coupled" to a second component can refer to two components directly connected to each other, or may refer to the two components having one or more components placed between them. In such arrangement, actuator 404 may be configured to move finger 402A-B by moving the base link of each finger.

In some examples, each finger 402A-B may be configured to move in a gripping direction, to contact, grasp, hold, grip, or otherwise interact with an object. Movement of the fingers may refer to rotation of the fingers about one or more axes. For example, the base of each finger may be rotatably coupled along a respective axis to one or more other components of the robotic gripping device, and movement of each finger may include rotation of the fingers about the respective axes. In this manner, the base of the fingers may remain relatively separated with respect to each other, while the tips of the fingers (e.g., the parts of the fingers opposite the bases) rotate toward each other, and may contact each other.

In other examples, movement of the fingers may include movement along an axis, such as translational movement in a clamping or sliding manner. The fingers may be coupled to one or more components of the robotic gripping device in a manner that allows them to maintain their orientation with respect to each other without rotating. For instance, the fingers may move in a manner similar to how the components of a vice move toward each other, such that the planes created by the gripping surface of each finger remain fixed relative to each other while movement of the fingers occurs. In yet other examples, the gripping motion may involve a combination of translational movement and rotational movement. Other types of movement are contemplated, with the above examples being included for description and to aid in understanding of the concepts involved herein.

The gripping surface or the front face 408A, 408B of the fingers may be bendable but inextensible, and may be a flexible plastic, rubber, or other material suitable for gripping an object. As a result, movement of the fingers may include deformation of the front face 408A, 408B and/or structure of the fingers. For example, the fingers may deform, bend, curve, distort, warp, or otherwise alter their shape based on one or more factors, such as an impacting force or pressure. In an example embodiment, a two finger robotic gripping device, such as the one shown in FIG. 4, may include an object placed at the midpoint of the fingers. When the fingers close on the object, the object may cause the front face 408A and/or 408B to bend or curl around the object. As more pressure or force is applied to the object, the front face 408A and/or 408B may further bend, curl, or wrap around the object. As described herein, movement of the fingers may include this deformation of the fingers.

In some examples, the fingers may be underactuated or hyper-underactuated. Underactuated fingers do not include an actuator for each phalanx of the finger, but instead have fewer actuators and cannot control each phalanx independently. A phalanx is a section of a finger. As an example, a typical human index finger includes three phalanges. Underactuated fingers require less complex control systems and are simpler to manufacture than fully actuated fingers. Hyper-underactuated fingers may include one actuator to move two or more fingers. For instance, in a robotic gripping device having two hyper-underactuated opposable fingers that close in a pinching manner, a single actuator may cause both fingers to move toward each other to pinch an object.

The fingers may be configured such that movement of a first finger can occur while movement of a second finger is prevented, such as by an object or the environment (e.g., a wall, table, or other body in an environment) in which the robotic gripping device exists. The two finger robotic gripping device shown in FIG. 4 may include a single actuator that causes both fingers to move (e.g., hyperunderactuated fingers). Further when a first of the two fingers is prevented from movement because it has contacted an object or the environment, the second finger may move or may continue to move.

Figure 5C:
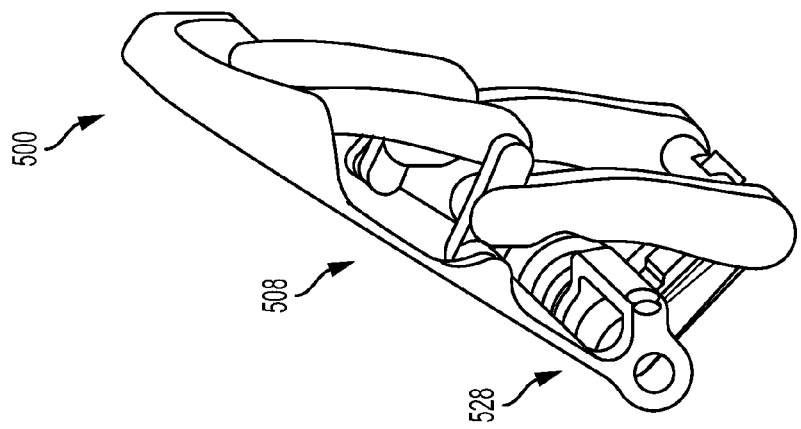
FIGS. 5A, 5B, and 5C illustrate an example finger of a robotic gripping device, according to an example implementation
Figure 5B:
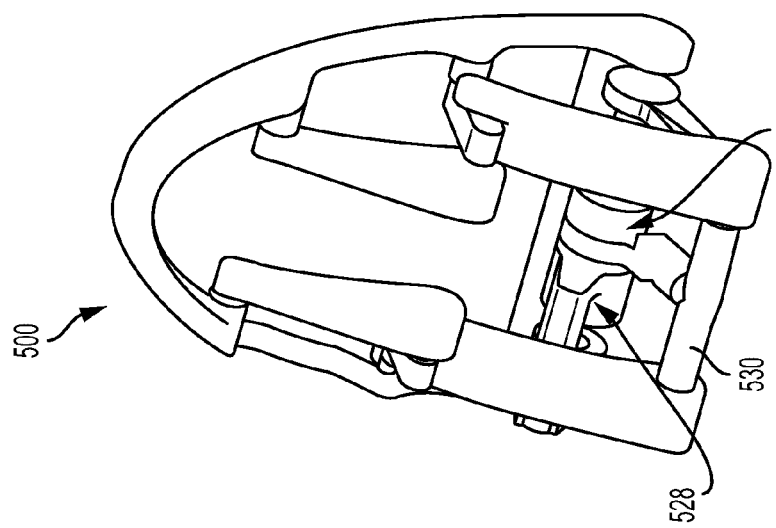
Figure 5A:
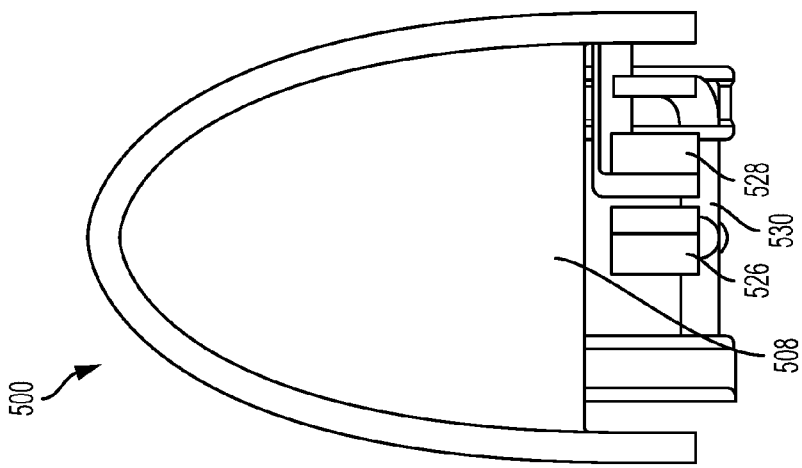

FIGS. 5A-5C illustrate an example finger 500 of a robotic gripping device, such as robotic gripping device 400, according to an example implementation. Finger 500 may be similar or identical to finger 402A and/or 402B. As shown, finger 500 includes a first encoder 526, second encoder 528, base link 530, and a deformable front face 508. In some examples, a robotic gripping device may not include first encoder 526. Such examples may include a robotic gripping device with fingers that move in a clamping or 'vice-like' manner.

In some examples, first encoder 526 may be coupled to the base link 530 of finger 500. Second encoder 528 may be coupled to the deformable front face 508, proximate to the base link 530. Keeping first encoder 526 and second encoder 528 proximate to base link 530 and proximate to each other may reduce cost and footprint of the robotic gripping device, while making it easier to enshroud each encoder. As shown in FIG. 5A, first encoder 526 is coupled to base link 530 at the bottom center near the bottom portion of deformable front face 508. First encoder 526, however, may be coupled to base link 530 to the right or left of the bottom center position shown in FIG. 5A.

First encoder 526, and second encoder 528 may be rotary encoders. In some cases, the encoders may be mechanical, optical, magnetic, capacitive, or any other type of encoder. In addition, the encoders may be absolute encoders or may be incremental encoders. Further, first encoder 526, and second encoder 528 may be the same type of encoder or may be different. To further reduce the complexity of the robotic gripping device, first encoder 526 and second encoder 528 may be aligned on the same rotational axis. In other embodiments, first encoder 526, and second encoder 528 may be aligned in a different rotational axis relative to each other.

In some embodiments, first encoder 526 may be configured to detect a grip angle of a finger while the robotic gripping device is gripping an object. A grip angle may be the amount of rotation of a finger through its respective axis (e.g., half turn, quarter turn, twenty degree turn, etc.) from an open position (e.g., starting position of the robotic gripping device) to a position in which the finger is in contact with an object. In operation, an actuator (not shown) may be coupled to base link 530 and may rotate base link 530 in order to move finger 500 towards an object. As the actuator rotates base link 530, first encoder 526 may measure the rotation to determine the grip angle.

In other examples, second encoder 528 may be configured to detect a bend angle of the deformable front face 508 while the robotic gripping device is gripping an object. A bend angle may be the amount of curvature, or bendedness of the deformable front face 508 of finger 500 after finger 500 makes contact with an object. The front face 508 may continue to deform, bend, curve, warp, or otherwise alter its shape (thereby increasing the bend angle) while more pressure is applied to an object. The bend angle may be measured from the bottom of deformable front face 508 near the base of finger 500, and the overall bendedness or deformity of deformable front face 508 may be determined based on this measurement. As shown in FIGS. 5A and 5C, for example, second encoder 528 may be coupled to the bottom edge of deformable front face 508. The joint or linkage that couples second encoder 528 to deformable front face 580 may extend towards first encoder 526 in order to keep first encoder 526 and second encoder 528 proximate to base link 530 and proximate to each other. The joint or linkage may also extend second encoder 528 to a position near the bottom center portion of deformable front face 508 to measure the bendedness or deformity near the area. The overall bendedness or deformity of deformable front face 508 (e.g., bend angle) may be determined based on this measurement.

In some embodiments, a robotic gripping device may include a control system such as control system 118 in FIG. 1, which may control one or more aspects of robotic gripping device 400 in FIG. 4. The control system may include one or more processors, and may also include a non-transitory computer-readable memory, which may have stored thereon instructions executable by the one or more processors to carry out one or more actions described in this disclosure.

In some examples, the control system may be configured to identify an object for a robotic gripping device to grasp, and activate the actuator to move the finger or fingers. FIGS. 6A-6D illustrate an example robotic gripping device 600 grasping a spherical object 610 at different positions of the front face 608A-B of fingers 602A-B. Robotic gripping device 600 may be similar or identical to robotic gripping device 400. Additionally, fingers 602A-B may be similar or identical to finger 500. In particular, each finger (602A and 602B) may include a deformable front face 508, base link 530, first encoder 526, and second encoder 528 as shown in FIGS. 5A-5C.

FIG. 6A shows robotic gripping device 600 in the open position before fingers 602A-B are moved towards object 610. Using optical sensor data of a robot, the control system may be configured to position robotic gripping device 600 so that object 610 is positioned between fingers 602A-B. The optical sensor data may provide information related to the position of the object relative to fingers 602A-B and information related to the surround environment.

In particular, the control system may be configured to position robotic gripping device 600 such that fingers 602A-B grasp object 610 near the middle portion of front face 608A-B. However, while fingers 602A-B are moved towards object 610 via actuator 604, object 610 may inadvertently move or shift. In some instances, the optional sensor data received may be inaccurate, thereby causing fingers 602A-B to grasp object 610 by the fingertips as shown in FIG. 6B. As shown, grasping object 610 by the fingertips of fingers 602A-B may cause front face 608A-B to deform or bend near the fingertips of fingers 602A-B as pressure is applied to object 610. While the fingers touch or grasp object 610, the control system may be configured to receive sensor data from first encoder 526 and second encoder 528. For example, the control system may receive sensor data from first encoder 526, indicating the grip angle of the finger 602A and/or 602B while the robotic gripping device is gripping an object. The control system may also receive sensor data from second encoder 528, indicating the bend angle of the front face of the finger 602A and/or 602B while the robotic gripping device is gripping the object.

In some embodiments, first encoder 526 and second encoder 528 may be aligned on the same axis. In such embodiment, the bend angle may be calculated relative to the grip angle. For example, in FIG. 6B, the grip angle is approximately 30 degrees and the relative bend angle is about 5 degrees. In other embodiments, first encoder 526 and second encoder 528 may not be aligned on the same axis. In such embodiments, the bend angle may be calculated from the open position of robotic gripping device 600. For example, if first encoder 526 and second encoder 528 are not aligned on the same axis in robotic gripping device 600, the bend angle in FIG. 6B is approximately 25 degrees.

Based on the grip angle and the bend angle, the control system may further determine a grip quality of fingers 602A-B. For a given shape of an object, the control system may have an expected or desired range of grip angles and bend angles that indicate a good grip quality. For example, for object 610, the desired or expected relative bend angle may be between 20-35 degrees. In FIG. 6B, the relative bend angle of 5 degrees may indicate a fingertip grasp, which may also indicate a relative bend angle well below the expected or desired range.

Additionally, based on the grip angle and the bend angle, the control system may determine the location or position of object 610. For example, in FIG. 6B, the control system may determine that object 610 is located at or near the fingertips of fingers 602A-B. Determining the location of the grasped object 610 within robotic gripping device 600 is of particular relevance as it provides the ability to deterministically bring object 610 into physical interaction with the environment. For example, knowing the location of object 610 within robotic gripping device 600 may be necessary to bring object 610 into locationally accurate contact with another object, such as a workpiece. In another example, knowing the location of object 610 within robotic gripping device 600 may allow robotic gripping device 600 to set object 610 down gently on a surface.

To improve the grip quality of fingers 602A-B, the control system may be configured to cause finger 602A and/or 602B to adjust its grip of object 610. For example, the robotic gripping device may grasp an object by the fingertips of the finger as shown in FIG. 6B. To improve the grip quality (e.g., have better control over the object), it may be desirable to adjust the grip angle of the finger and/or bend angle of the front face of the finger. In particular, it may be desirable to grasp the object near the middle portion of the finger as shown in FIG. 6D or grasp the object near the base of the finger as shown in FIG. 6C. To adjust the grip of fingers 602A-B and location of object 610, the control system may cause the actuator 604 to move finger 602A and/or 602B away from object 610, change the position of the robotic gripping device, and then cause actuator 604 to move finger 602A and/or 602B back towards object 610 to grasp object 610 at a different portion of the finger.

For example, after gripping object 610 by the fingertips as shown in FIG. 6B, the control system may adjust the grip of fingers 602A-B to grasp the object near the base of fingers 602A-B as shown in FIG. 6C. As shown in FIG. 6C, front face 608A-B is deformed into the curvature of object 610 near the base of front face 608A-B. The grip angles of fingers 602A-B are identical or nearly identical to the grip angle shown in FIG. 6B (e.g., 30 degrees). Unlike FIG. 6B, the relative bend angle in FIG. 6C is approximately 27 degrees, which is much greater than the relative bend angle in FIG. 6B and within the desired range of relative bend angles. However, by comparing the measured angles with the desired range angles, the control may determine that object 610 was not grasped in a position with the best or desired grip quality.

To further improve the grip quality of fingers 602A-B, the control system may adjust the grip of fingers 602A-B and location of object 610 to grasp object 610 near the middle portion of the front face 608A-B. For example, the control system may adjust the grip of fingers 602A-B and location of object 610 from FIG. 6C to FIG. 6D. As shown in FIG. 6D, front face 608A-B is deformed into the curvature of object 610 near the middle portion of front face 608A-B. The bend angle is slightly greater than the bend angle in FIG. 6C as the fingers 602A-B are wrapped around object 610. Further, the grip angle are slightly greater in FIG. 6D as fingers 602A-B are rotated further towards each other to grasp object 610.

In some examples, based on the grip angle and the bend angle, the control system may determine the shape or size of object 610 that is being grasped. Determining the shape or size of an object is of particular relevance as it provides additional tactile information in an environment in which the robotic gripping device interacts with. For example, the control system of robotic gripping device 600 may distinguish a rectangular object from a cylindrical or spherical object such as object 610 based on the grip angle and bend angle. A cylindrical or spherical object may have a greater bend angle as the front face of the finger will likely deform or bend into the curvature of such object as the finger makes contact with the object and further applies pressure to it. Additionally, knowing the portions of fingers 602A-B that are in contact with object 610 may allow the control system to determine the size of object 610 that is being grasped.

IV. EXAMPLE METHODS

Figure 7:
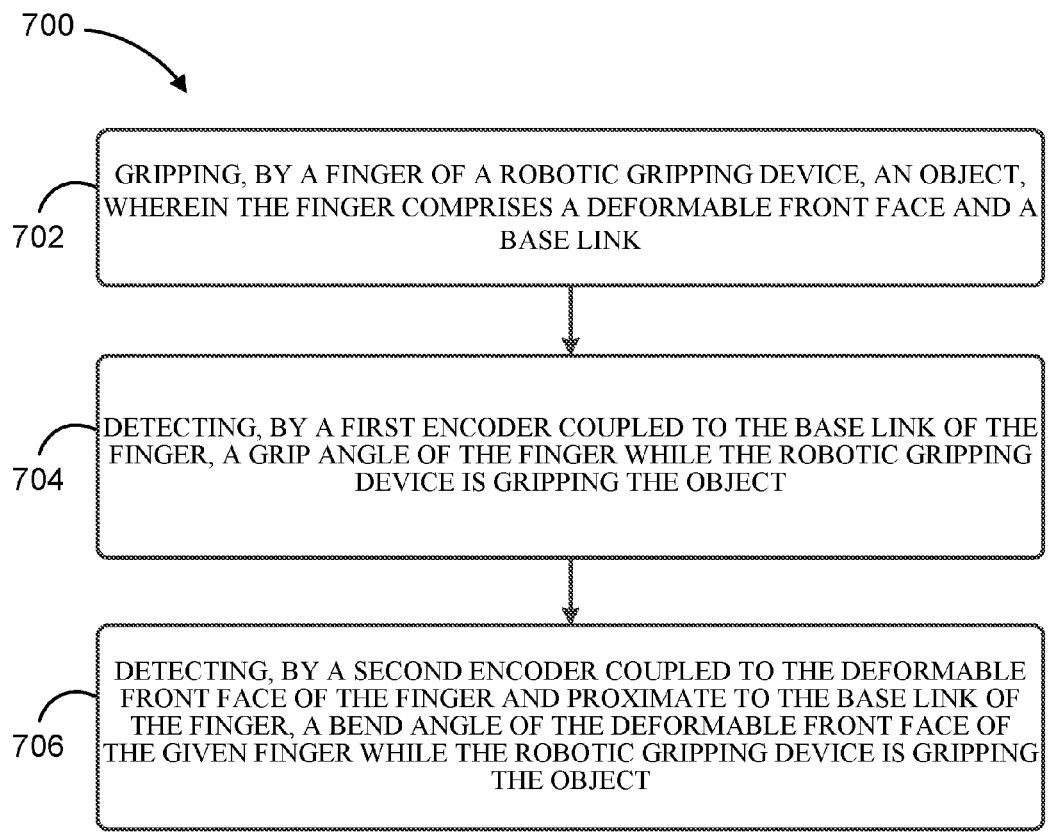
FIG. 7 is a flow chart, according to an example implementation.

FIG. 7 illustrates a flowchart of an example method 700 that can be implemented within an operating environment including or involving, for example, the control system 118 of FIG. 1, the robotic arm 200 of FIG. 3, the robotic gripping device 400 of FIG. 4, finger 500 of FIGS. 5A-5C, and/or the robotic gripping device 600 of FIGS. 6A-6D. Method 700 may also be applied to other robotic gripping devices having different arrangements and/or different components than those described herein. Further, Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Method 700 begins at block 702, which includes a finger of a robotic gripping device gripping an object. In some examples, gripping an object may include the robotic gripping device grasping, pinching, holding, or wrapping around an object. In some embodiments, gripping an object may include a robotic gripping device positioning the robotic gripping device such that the object is between the fingers of the robotic gripping device.

In some embodiments, a robotic gripping device may include multiple fingers to grip an object. For example, the robotic gripping device may include two opposable fingers that are configured to move toward each other to grip the object. In other example embodiments, more or fewer fingers may be included. For instance, where three or more fingers are included, the fingers may be arranged in two groups opposing each other, such that when they are actuated they close toward each other. Two fingers may be positioned opposite the third, such that when the fingers close they interlock. Alternatively, a robotic gripping device may include a single finger coupled to either end of an actuator.

At block 704, method 700 may include detecting a grip angle of the finger while the robotic gripping device is gripping the object. For example, the robotic gripping device may include a first encoder similar or identical to first encoder 526 of FIGS. 5A-5C. In some examples, the first encoder may be coupled to the base link of the finger as shown in FIGS. 5A-5C. As described previously, the first encoder may detect the movement and/or rotation of the finger or the grip angle of the finger while the robotic gripping device is gripping the object.

At block 706, method 700 may include detecting a bend angle of the front face of the finger while the robotic gripping device is gripping the object. For example, the robotic gripping device may include a second encoder similar or identical to second encoder 528 of FIGS. 5A-5C. As shown in FIGS. 5A-5C, in some examples, the second encoder may be coupled to the front face of the finger, proximate to the base link of the finger. For example, the second encoder may be coupled to the bottom edge of the front face near the base link of the finger. In some examples, the second encoder may be coupled to the front face of the finger via a joint or linkage that further extends the second encoder towards and near the first encoder. In other examples, the second encoder may be coupled to a joint or linkage which may also be coupled to the bottom, top, or middle edge of the front face. The joint or linkage may then extend the second encoder to a position near the base link of the finger to keep the second encoder proximate to the base link of the finger. Other examples possible.

As described previously, the finger may deform, bend, curve, warp, stretch, or otherwise alter its shape while gripping or applying pressure to an object. While the finger closes on the object, the second encoder may detect the angle, curvature, or bendedness of the finger.

In some embodiments, the second encoder may be on the same axis as the first encoder to simplify calculations in determining the desired grip quality of the fingers. For example, the control system may have a range of desired grip angles and bend angles based on the shape and/or size of an object. The desired grip angle or bend angle may be relative to one another (e.g., the control system may determine the desired bend angle based on the measure grip angle, and vice versa). In such example, it may be desirable to have the encoders on the same axis to easily determine the desired grip quality of the fingers.

Additionally, having the encoders on the same axis may simplify the mechanical elements of the encoder circuitry. For example, the encoders may include a chip and a magnet target. The magnet targets may be off-axis (ring) magnet targets or on-axis (diametric) magnet targets. For off-axis (ring) magnet targets, having the encoders on the same axis may allow each encoder chip to be arranged side-by-side on the same circuit board. For on-axis (diametric) magnet targets, having the encoders on the same axis may allow each encoder chip to be arranged back-to-back on the same circuit board.

In some examples, method 700 may include a control system similar or identical to control system 118 of FIG. 1. As described previously, the control system may receive sensor data indicating the grip angle of the finger while the robotic gripping device is gripping an object. In a further example, the control system may receive sensor data indicating the bend angle of the finger while the robotic gripping device is gripping the object.

Based on the grip angle and the bend angle, the control system may determine the shape of the object being grasped. For example, the control system of the robotic gripping device may distinguish a rectangular object from a cylindrical or spherical object. A cylindrical or spherical object may have a greater bend angle as the front face of the finger will likely deform or bend into the curvature of such object as the finger makes contact with the object and further applies pressure to it.

Additionally, based on the grip angle and the bend angle, the control system may further determine a grip quality of the finger. In some example methods, to improve the grip quality of the finger, the control system may be configured to cause the finger to adjust its grip. For example, the robotic gripping device may grasp an object by the fingertips of the finger at a certain grip angle and bend angle. To improve the grip quality (e.g., have better control over the object), it may be desirable to adjust the grip angle of the finger and/or bend angle of the front face of the finger. In some examples, it may be desirable to grasp the object at the middle portion of the finger instead of grasping the object by the fingertips. To adjust the grip, the control system may cause the actuator to move the finger away from the object that is being grasped by the fingertips, change the position of the robotic gripping device, and then cause the actuator to move the finger back towards the object to grasp the object at the middle portion of the finger.

In some embodiments, based on the grip angle and the bend angle, the control system may determine additional tactile information, such as the location of the object being grasped. For example, if the object is a tool, knowing the location of the tool within the robotic gripping device is necessary to bring the tool into locationally accurate contact with the workpiece. In another example, knowing the location of the object within the robotic gripping device allows the robot to set the object down gently on a surface.

In other embodiments, the control system may determine the size of the object that is being grasped based on the portions of the finger that are in contact with the object. For example, if an object is being grasped in a small portion of the middle portion of a finger, the control system may determine that the object is located in the middle portion of the finger and further determine that the object is a small object.

V. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A robotic gripping device comprising:
    a finger, wherein the finger comprises:
        a deformable front face;
        a base link proximate to a first end of the finger, wherein motion of the base link actuates the finger to cause the deformable front face thereof to engage an object;
    a first encoder proximate to the first end of the finger and coupled to the base link of the finger, wherein the first encoder is configured to detect a grip angle of the finger while the robotic gripping device is gripping the object; and
    a second encoder coupled to the deformable front face of the finger, wherein the second encoder is proximate to the first end of the finger, wherein the first encoder and the second encoder are aligned on a same rotational axis, and wherein the second encoder is configured to detect a bend angle of the deformable front face of the finger while the robotic gripping device is gripping the object.

2. The robotic gripping device of claim 1, wherein the finger is underactuated.

3. The robotic gripping device of claim 1, further comprising an actuator coupled to the finger and configured to move the finger by moving the base link of the finger.

4. The robotic gripping device of claim 1, further comprising a control system, wherein the control system is configured to:
    receive sensor data indicative of the grip angle of the finger from the first encoder of the finger;
    receive sensor data indicative of the bend angle of the deformable front face of the finger from the second encoder of the finger; and
    determine a grip quality of the finger based on the grip angle of the finger and the bend angle of the deformable front face of the finger.

5. The robotic gripping device of claim 4, wherein the control system is further configured to cause the finger to adjust a grip on the object based on the grip quality of the finger.

6. The robotic gripping device of claim 1, further comprising a control system, wherein the control system is configured to:
    receive sensor data indicative of the grip angle of the finger from the first encoder of the finger;
    receive sensor data indicative of the bend angle of the deformable front face of the finger from the second encoder of the finger; and determine tactile information of the object based on the grip angle of the finger and the bend angle of the deformable front face of the finger, wherein the tactile information comprises at least one of the following: a shape of the object, size of the object, or location of the object.

7. The robotic gripping device of claim 1, wherein the robotic gripping device further comprises:
a second finger, wherein the second finger comprises:
a second deformable front face;
a second base link proximate to a first end of the second finger, wherein motion of the second base link actuates the second finger to cause the second deformable front face thereof to engage the object;
a further first encoder proximate to the first end of the finger and coupled to the second base link of the second finger, wherein the further first encoder is configured to detect a grip angle of the second finger while the robotic gripping device is gripping the object; and
a further second encoder coupled to the deformable front face of the second finger, wherein the further second encoder is proximate to the first end of the second finger, and wherein the further second encoder is configured to detect a bend angle of the second deformable front face of the second finger while the robotic gripping device is gripping the object.

8. A method comprising:
gripping, by a finger of a robotic gripping device, an object, wherein the finger comprises a deformable front face and a base link proximate to a first end of the finger, and wherein motion of the base link actuates the finger to cause the deformable front face thereof to engage the object;
detecting, by a first encoder coupled to the base link of the finger and proximate to the first end of the finger, a grip angle of the finger while the robotic gripping device is gripping the object; and
detecting, by a second encoder coupled to the deformable front face of the finger and proximate to the first end of the finger, a bend angle of the deformable front face of the finger while the robotic gripping device is gripping the object, wherein the first encoder and the second encoder are aligned on a same rotational axis.

9. The method of claim 8, wherein the finger is underactuated.

10. The method of claim 8, further comprising:
determining, by a control system of the robotic gripping device, a grip quality of the finger based on the grip angle of the finger and the bend angle of the deformable front face of the finger.

11. The method of claim 10, further comprising:
causing, by the control system, the finger to adjust a grip on the object based on the determined grip quality of the finger.

12. The method of claim 8, further comprising:
determining, by a control system of the robotic gripping device, tactile information of the object based on the grip angle of the finger and the bend angle of the deformable front face of the finger, wherein the tactile information comprises at least one of the following: a shape of the object, size of the object, or location of the object.

13. A robot comprising:
a robotic gripping device comprising:
a finger, wherein the finger comprises:
a deformable front face;
a base link proximate to a first end of the finger, wherein motion of the base link actuates the finger to cause the deformable front face thereof to engage an object;
a first encoder proximate to the first end of the finger and coupled to the base link of the finger, wherein the first encoder is configured to detect a grip angle of the finger while the robotic gripping device is gripping the object; and
a second encoder coupled to the deformable front face of the finger, wherein the second encoder is proximate to the first end of the finger, wherein the first encoder and the second encoder are aligned on a same rotational axis, and wherein the second encoder is configured to detect a bend angle of the deformable front face of the finger while the robotic gripping device is gripping the object; and
a control system configured to:
receive sensor data indicative of the grip angle of the finger from the first encoder of the finger; and
receive sensor data indicative of the bend angle of the deformable front face of the finger from the second encoder of the finger.

14. The robot of claim 13, further comprising an actuator coupled to the finger and configured to move the finger by moving the base link of the finger.

15. The robot of claim 13, wherein the control system is further configured to:
determine a grip quality of the finger based on the grip angle of the finger and the bend angle of the deformable front face of the finger.

16. The robot of claim 15, wherein the control system is further configured to cause the finger to adjust a grip on the object based on the grip quality of the finger.

17. The robot of claim 13, wherein the control system is further configured to:
determine tactile information of the object based on the grip angle of the finger and the bend angle of the deformable front face of the finger, wherein the tactile information comprises at least one of the following: a shape of the object, size of the object, or location of the object.

18. The robotic gripping device of claim 1, wherein the deformable front face spans a length of the finger.

19. The method of claim 8, wherein gripping the object comprises moving the base link of the finger by an actuator coupled to the finger.

20. The robot of claim 13, wherein the finger is underactuated.

* * * * *